(12) United States Patent
Ono

(10) Patent No.: US 10,407,873 B2
(45) Date of Patent: Sep. 10, 2019

(54) WORK VEHICLE AND AUTOMATIC STOP SYSTEM OF WORK VEHICLE

(71) Applicant: ISEKI & CO., LTD., Matsuyama-shi (JP)

(72) Inventor: Koki Ono, Ehime-ken (JP)

(73) Assignee: ISEKI & CO., LTD., Matsuyama-shi (JP)

(*) Notice: Subject to any disclaimer, the term of this patent is extended or adjusted under 35 U.S.C. 154(b) by 0 days.

(21) Appl. No.: 15/810,216

(22) Filed: Nov. 13, 2017

(65) Prior Publication Data

US 2018/0282973 A1 Oct. 4, 2018

(30) Foreign Application Priority Data

Mar. 28, 2017 (JP) ................. 2017-063940

(51) Int. Cl.
*E02F 9/20* (2006.01)
*G05D 1/00* (2006.01)
*G08G 1/16* (2006.01)
*B60T 7/22* (2006.01)
*G05D 1/02* (2006.01)

(52) U.S. Cl.
CPC ............ *E02F 9/205* (2013.01); *B60T 7/22* (2013.01); *G05D 1/0011* (2013.01); *G05D 1/0022* (2013.01); *G05D 1/0055* (2013.01); *G05D 1/0214* (2013.01); *G08G 1/166* (2013.01); *G05D 2201/0201* (2013.01); *G05D 2201/0202* (2013.01)

(58) Field of Classification Search
CPC ..... E02F 9/205; G05D 1/0011; G05D 1/0055; G05D 1/0022; G05D 2201/0201; G05D 2201/0202; G08G 1/166; B60T 7/22

USPC .......................................... 701/2, 50
See application file for complete search history.

(56) References Cited

U.S. PATENT DOCUMENTS

| 2001/0044697 A1* | 11/2001 | Kageyama | ............ B60W 40/04 701/301 |
| 2006/0271263 A1* | 11/2006 | Self | ......................... G01S 3/143 701/50 |
| 2011/0172892 A1* | 7/2011 | Matsuzaki | .............. B60R 16/08 701/58 |

FOREIGN PATENT DOCUMENTS

JP        62-297909        12/1987

* cited by examiner

*Primary Examiner* — Isaac G Smith
(74) *Attorney, Agent, or Firm* — Oblon, McClelland, Maier & Neustadt, L.L.P.

(57) ABSTRACT

A work vehicle according to an embodiment includes: (i) a travelling vehicle body that includes a power source to a work part and a travel part; (ii) a communication unit that is able to transmit and receive signals to and from a portable communication terminal; and (iii) a control unit that is able to control the travel part on the basis of a signal transmitted from the portable communication terminal and received by the communication unit. A plurality of communication systems is provided between the communication unit and the portable communication terminal. The communication systems include a first communication system that is able to transmit a first signal from a portable communication terminal, and a second communication system that has a smaller communication area than that of the first communication system and is able to receive a second signal indicating that the portable communication terminal exists in a predetermined area.

8 Claims, 5 Drawing Sheets

WORK VEHICLE AND AUTOMATIC STOP SYSTEM OF WORK VEHICLE

CROSS-REFERENCE TO RELATED APPLICATION

The present application claims priority to and incorporates by reference the entire contents of Japanese Patent Application No. 2017-063940 filed in Japan on Mar. 28, 2017.

BACKGROUND OF THE INVENTION

1. Field of the Invention

The embodiment discussed herein is directed to a work vehicle and an automatic stop system of the work vehicle.

2. Description of the Related Art

Conventionally, there is known a configuration in which a sensor for detecting an obstacle is provided in a work vehicle, which is able not only to travel automatically but also to travel by a remote operation by using a transmitter, and the vehicle automatically stops when the sensor detects an obstacle.

Literature related to the conventional technique is Japanese Laid-open Patent Publication No. 62-297909, for example.

However, for reliably detecting an obstacle by using the sensor, the detection is to be performed in all directions, and thus a plurality of sensors is to be provided in the work vehicle. Moreover, there exists a fear for failing to detect an obstacle in some cases.

SUMMARY OF THE INVENTION

It is an object of the present disclosure to at least partially solve the problems in the conventional technology. A work vehicle according to an embodiment includes: (i) a travelling vehicle body that includes a power source to a work part and a travel part; (ii) a communication unit that is able to transmit and receive signals to and from a portable communication terminal; and (iii) a control unit that is able to control the travel part on the basis of a signal transmitted from the portable communication terminal and received by the communication unit. A plurality of communication systems is provided between the communication unit and the portable communication terminal. The communication systems include a first communication system that is able to transmit a first signal from a portable communication terminal, and a second communication system that has a smaller communication area than that of the first communication system and is able to receive a second signal indicating that the portable communication terminal exists in a predetermined area.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Hereinafter, an embodiment of the present disclosure will be described in detail with reference to the accompanying drawings. In the following embodiment, a work vehicle will be explained to be a tractor 1. The components in the following embodiment include ones that can easily be envisioned by those skilled in the art, substantially the same ones, and ones in what is called a range of equivalents. The present invention is not limited by the following embodiment.

Figure 1:
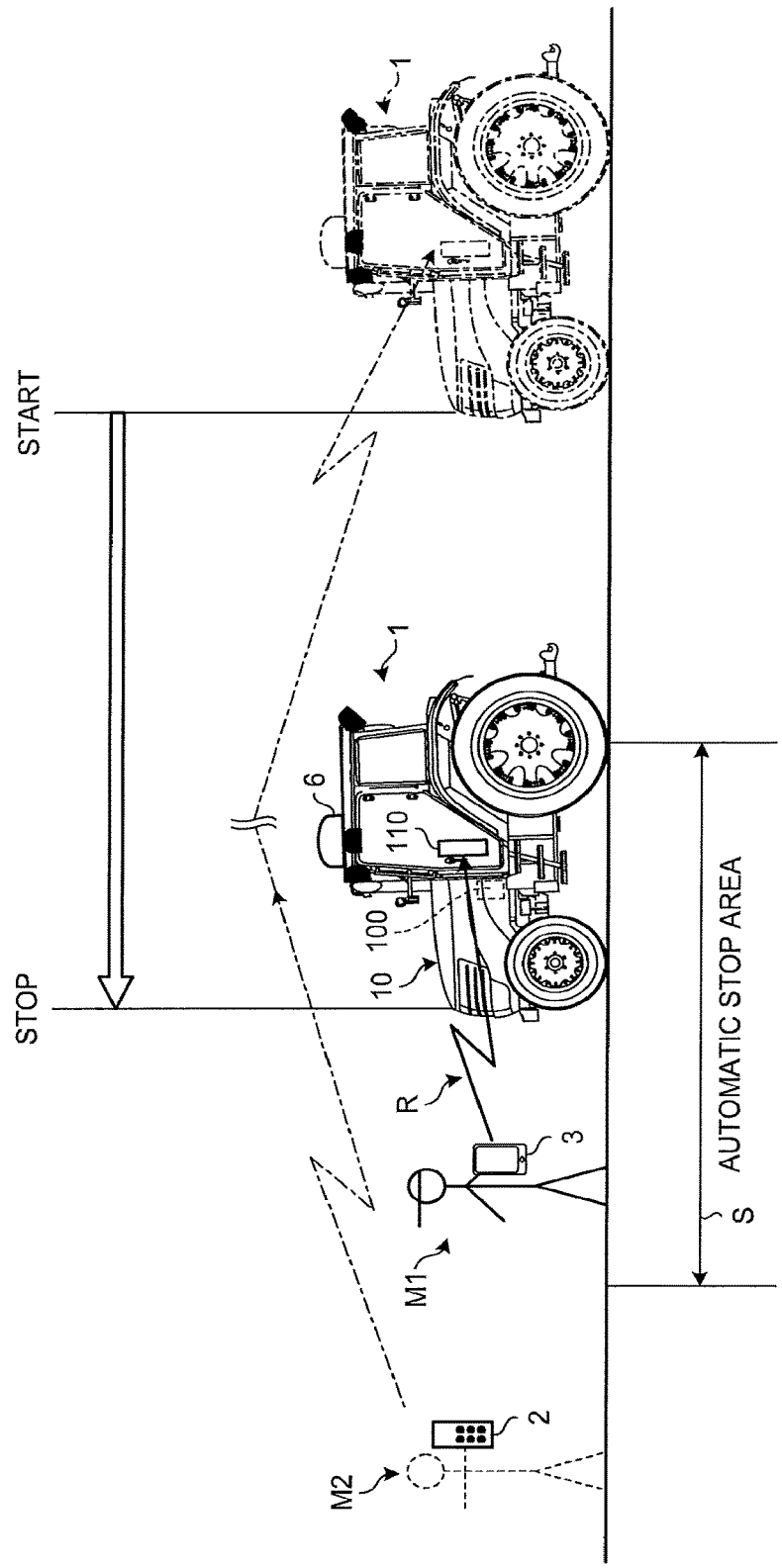
FIG. 1 is a diagram illustrating an automatic stop system of a work vehicle according to an embodiment.
Figure 2:
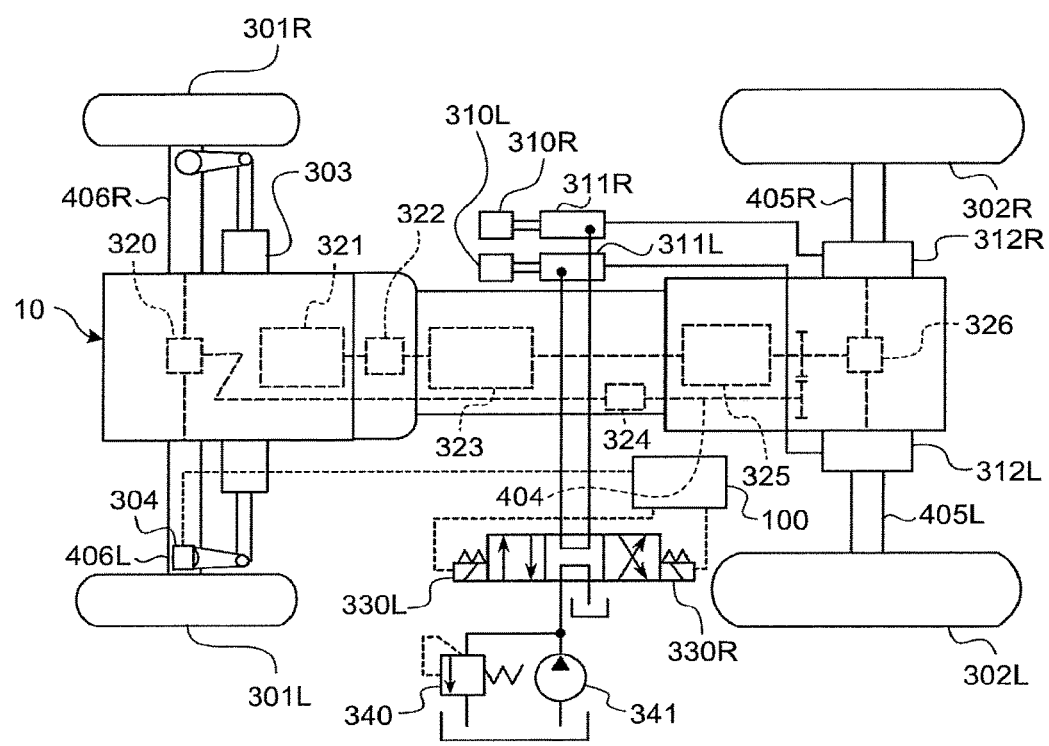
FIG. 2 is a diagram illustrating the work vehicle according to the embodiment.
Figure 3:
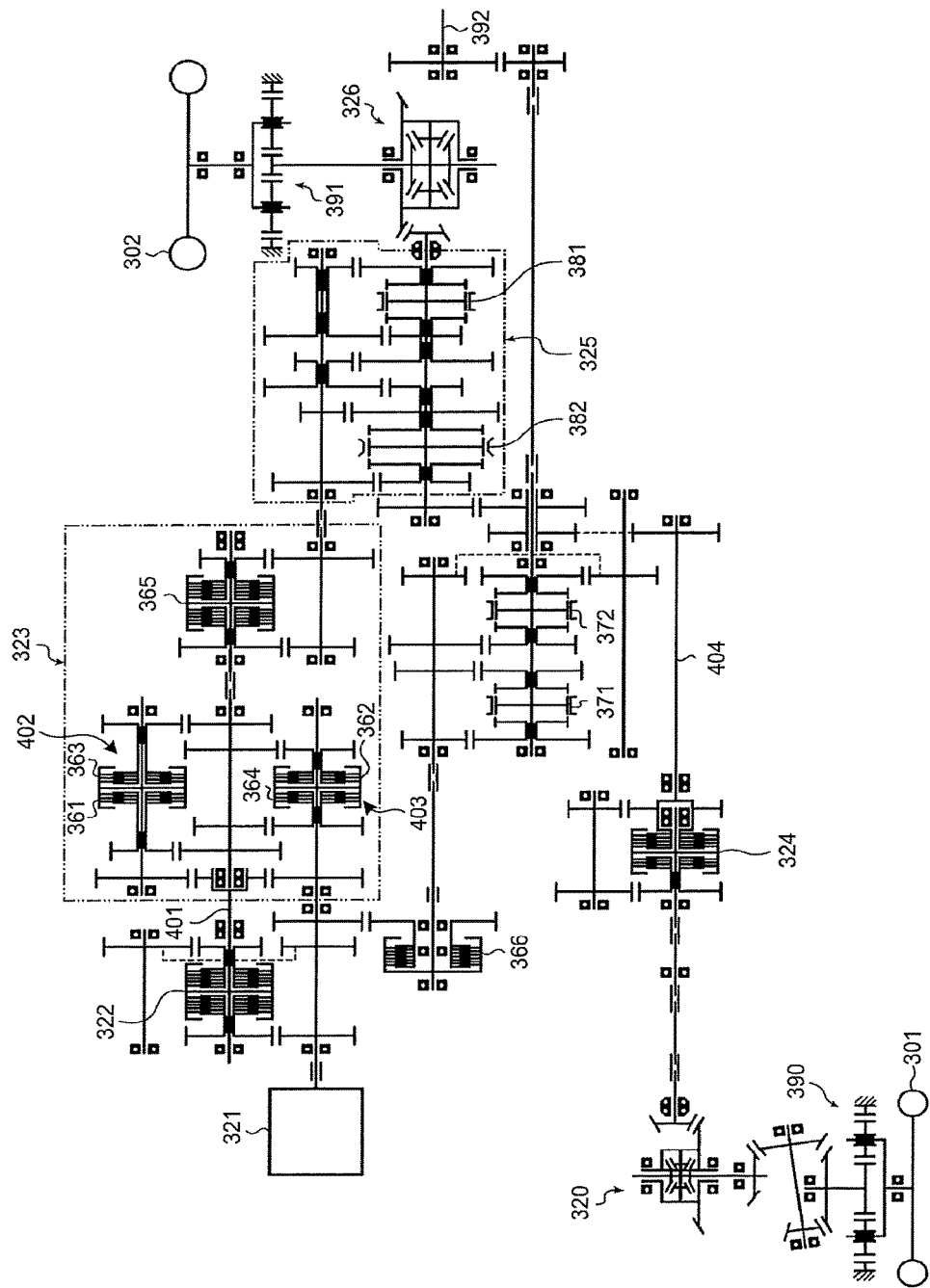
FIG. 3 is a diagram illustrating a power transmitting path of the work vehicle.
Figure 4:
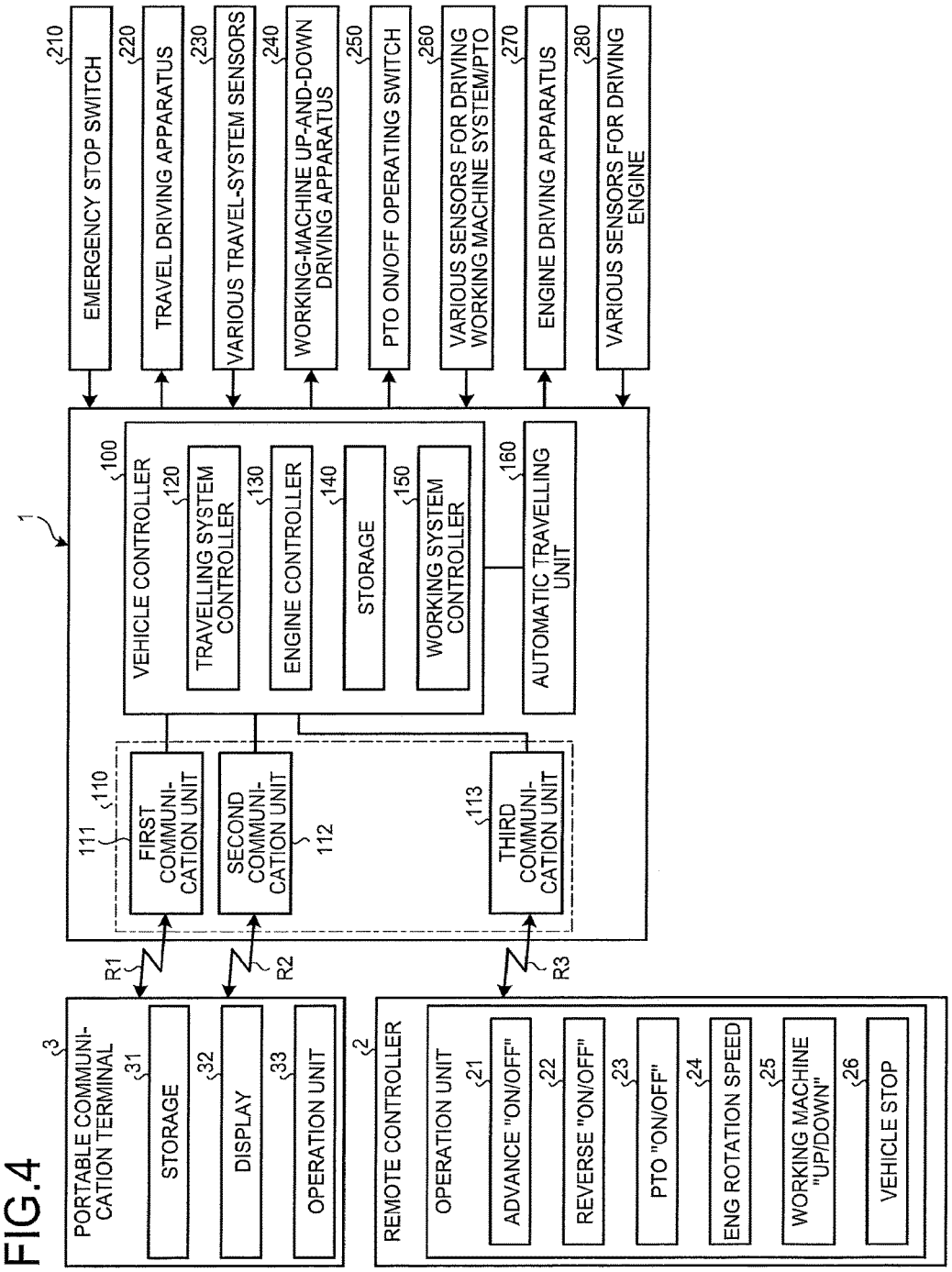
FIG. 4 is a control block diagram mainly illustrating a vehicle controller in the automatic stop system of the work vehicle according to the embodiment.

FIG. 1 is a diagram illustrating an automatic stop system of the tractor 1 according to the embodiment. FIG. 2 is a diagram illustrating the tractor 1. FIG. 3 is a diagram illustrating a power transmitting path of the tractor 1. FIG. 4 is a control block diagram mainly illustrating a vehicle controller 100 in the automatic stop system of the tractor 1.

As illustrated in FIG. 1, the automatic stop system of the tractor 1 according to the embodiment includes the tractor 1, a communication unit 110 that is provided in the tractor 1, a portable communication terminal 3 that is carried by a first worker M1, and the vehicle controller 100 that functions as a travel stopping unit. When the communication unit 110 receives a signal from the portable communication terminal 3, the travel stopping unit is able to stop a travel of the tractor 1 even when the tractor 1 is unmanned. In the present embodiment, the system includes a remote controller 2 that is able to perform a remote operation on the tractor 1. A second worker M2 is assumed to carry the remote controller 2. Hereinafter, the workers may be collectively referred to as "workers M".

The communication unit 110 of this automatic stop system includes a first communication unit 111, a second communication unit 112, and a third communication unit 113. The communication unit 110 is able to communicate with the portable communication terminal 3 by using a first communication system R1 via the first communication unit 111 and by using a second communication system R2 via the second communication unit 112. The communication unit 110 is able to communicate with the remote controller 2 by using a third communication system R3 via the third communication unit 113.

In other words, the portable communication terminal 3 is able to communicate with the tractor 1 by using a plurality of communication systems R including the first communication system R1 and the second communication system R2 (see FIG. 4). The first communication system R1 is able to transmit a stop signal. A communication area of the second communication system R2 is smaller than that of the first communication system R1, and is able to receive a detection signal indicating that the portable communication terminal 3 exists in a predetermined area.

A communication area of the third communication system R3, which connects the remote controller 2 and the communication unit 110, is defined to be larger than at least of that of the second communication system R2, and the second worker M2 is able to perform a remote operation by using the remote controller 2 with respect to a travel, a work, etc. of the tractor 1.

A short-distance radio communication standard is employed for the second communication system R2 among the plurality of communication systems R that connect the tractor 1 and the portable communication terminal 3. When receiving a second signal indicating that the portable communication terminal 3 exists in an automatic stop area S during travelling of a travelling vehicle body 10, the vehicle controller 100 of the tractor 1 is configured to cause the travelling vehicle body 10 to stop travelling. It is needless to say that the length of the automatic stop area S is approximate to that of a communicable area of the second communication system R2.

In this manner, a wireless communication standard, which has a larger communication area than that of the short-distance radio communication standard employed for the second communication system R2, is employed for the first communication system R1. When the first communication unit 111 of the communication unit 110 receives a first signal during travelling of the tractor 1, the vehicle controller 100 stops the travelling.

In other words, by employing a travel stopping system of the tractor 1 according to the present embodiment, a remote operation is able to be performed on the tractor 1 with respect to a travel or a travel stop by using a signal transmitted from the remote controller 2, moreover, the travel stop is performed by a signal from not only the remote controller 2 but also the portable communication terminal 3. In other words, the vehicle controller 100 performs an urgent stop when the communication unit 110 receives the first signal or the second signal.

Hereinafter, functions of the travel stopping system of the tractor 1 according to the present embodiment will be simply explained. As illustrated in FIG. 1, it is assumed that the worker M2 operates the remote controller 2 in a position exceeding at least the automatic stop area S so as to cause the unmanned tractor 1 to start at a predetermined speed, for example.

It is assumed that the tractor 1 advances to reach the automatic stop area S. In a case where the first worker M1 that carries the portable communication terminal 3 is in the automatic stop area S, when receiving the second signal sent from the portable communication terminal 3, the unmanned tractor 1 is automatically stopped. In other words, even when the second worker M2 carrying the remote controller 2 does not find the existence of the first worker M1, the unmanned tractor 1 is able to be automatically stopped when receiving the second signal sent from the portable communication terminal 3.

In this manner, the travel stopping system of the tractor 1 according to the present embodiment is able to detect the fact that the portable communication terminal 3 exists in the near distance, in addition to a signal transmitted from the remote controller 2 that is for stopping the tractor 1 by using a remote operation. Therefore, when the tractor 1 is caused to automatically travel in a field etc., a risk in the neighborhood of the travelling vehicle body 10 is able to be previously detected by the tractor 1 side so as to cause the tractor 1 to automatically stop, so that it is possible to contribute to improvement in the safety of the automatically-travelling tractor 1.

A configuration of the tractor 1 according to the present embodiment will be explained. The tractor 1 including the travelling vehicle body 10 further includes the vehicle controller 100 and the communication unit 110 as illustrated in FIG. 4. The travelling vehicle body 10 includes a steering handle (not illustrated), an operation pedal (not illustrated), and a maneuvering part provided with various instruments, and is configured so that a rear part of the travelling vehicle body 10 is able to be connected with a work part including a working machine or a working device (not illustrated). A Differential Global Positioning System (DGPS) antenna 6 (see FIG. 1), which receives radio waves transmitted from a plurality of navigation satellites, is placed on a ceiling part of the travelling vehicle body 10.

The vehicle controller 100 is constituted of a computer, and is able to control, by using electronic control, various units of the tractor 1 such as an automatic travelling unit 160. The communication unit 110 is able to communicate with the remote controller 2 and the portable communication terminal 3 in a wireless manner.

The tractor 1 includes various mechanisms such as power transmitting mechanisms illustrated in FIGS. 2 and 3. In other words, as illustrated in FIG. 2, the tractor 1 includes, on the respective left and right sides of the travelling vehicle body 10, (i) front wheels 301L and 301R that are attached to left and right front axles 406L and 406R and (ii) left and right rear wheels 302L and 302R that are attached to left and right rear axles 405L and 405R. Hereinafter, the left side is indicated by the reference symbol represented with "L" and the right side is indicated by the reference symbol represented with "R", when there exists no need for identifying the left or right, the reference symbol is to be described as, for example, a front wheel 301, a rear wheel 302, etc.

On a front part of the travelling vehicle body 10, an engine 321 as a power source is mounted, and the power is transmitted from this engine 321 to the front wheels 301 and the rear wheels 302 via the power transmitting mechanism. The tractor 1 according to the present embodiment includes a 4-wheel-drive (4WD) clutch 324, and is configured to be able to switch between (i) a 2-wheel-drive (2WD) type in which only the rear wheels 302 are driven and (ii) a 4WD type in which the front wheels 301 along with the rear wheels 302 are driven, caused by switching of the 4WD clutch 324.

In the power transmitting mechanism to the rear wheels 302, a main transmission unit 323 is arranged in a subsequent stage of the engine 321 while placing an advance/reverse clutch 322 therebetween, a sub-transmission unit 325 is arranged in a subsequent stage of the main transmission unit 323, and a rear-wheel differential gear device 326 is arranged in a subsequent stage of the sub-transmission unit 325. Brake devices 312 are arranged in bases of the rear axles 405 that connect the rear-wheel differential gear device 326 and the rear wheels 302 with one another.

In the power transmitting mechanism to the front wheels 301, a transmission shaft 404 is arranged in the subsequent stage of the sub-transmission unit 325. The power is transmitted to the transmission shaft 404 via idle gears. The power transmitting mechanism is configured so that the power is transmitted from the transmission shaft 404 to the front wheels 301 via the 4WD clutch 324 and a front-wheel differential gear device 320.

The tractor 1 according to the present embodiment includes the automatic travelling unit 160 (see FIG. 4), which is controlled by the vehicle controller 100, so as to travel automatically. A steering-angle sensor 304, which detects a steering angle of the front wheels 301, is connected to the vehicle controller 100. The vehicle controller 100 controls, during automatic travelling, a steering cylinder 303 while feed-backing the detected actual steering angle of the front wheels 301 so that the tractor 1 performs steering.

When an operator depresses a brake pedal 310 that is provided in a machine body, brake cylinders 311 are driven by hydraulic pressure, and the brake devices 312 functions that are provided to the rear wheels 302. In other words, the left brake device 312L arranged in the base of the left rear axle 405L is connected with the left brake cylinder 311L and the right brake device 312R arranged in the base of the right rear axle 405R is connected with the right brake cylinder 311R.

As illustrated in FIG. 2, the left and right brake cylinders 311L, 311R are connected with left and right brake solenoids 330L, 330R that are connected with the vehicle controller 100. Thus, when a predetermined brake signal is input to the vehicle controller 100, the vehicle controller 100 drives at least one of the brake solenoids 330 to operate one or both of the left and right brake devices 312L, 312R. The brake solenoid 330 constitutes a hydraulic circuit along with, for example, a hydraulic pump 341, a relief valve 340, etc.

Next, with reference to FIG. 3, the power transmitting path of the tractor 1 from the engine 321 to the front wheels 301 and the rear wheels 302 will be explained. As illustrated in FIG. 3, an output shaft of the engine 321 is connected with a power transmitting shaft via the advance/reverse clutch 322 for switching between advance and reverse. Therefore, the tractor 1 switches the advance/reverse clutch 322 to be able to selectively rotate the power transmitting shaft in a normal or reverse direction.

The power transmitting shaft is connected with the main transmission unit 323 and the sub-transmission unit 325. The main transmission unit 323 is provided with (i) a 1-speed/3-speed switching clutch 402 including a first clutch gear 361 and a third clutch gear 363 and (ii) a 2-speed/4-speed switching clutch 403 including a second clutch gear 362 and a fourth clutch gear 364 to be able to change the power that is output from the engine 321 into any one of the 1-speed to the 4-speed and output the changed power.

Moreover, the main transmission unit 323 is provided with a high/low clutch 365. Thus, the main transmission unit 323 is able to switch each of the 1-speed to the 4-speed into a fast or low speed.

The sub-transmission unit 325, to which the power of the main transmission unit 323 is input, includes a first shifter 381 and a second shifter 382 of double-sequential sub-transmission clutches to be operated by using a sub-transmission lever (not illustrated), and a plurality of transmission gears. With which transmission gear the first shifter 381 and the second shifter 382 engage changes the speed into any one of a super-low speed, a low speed, a middle speed, and a high speed. Rotation of an output shaft of the sub-transmission unit 325 is transmitted to the rear wheels 302 from the rear-wheel differential gear device 326 via the axles and a rear-wheel planetary-gear mechanism 391.

The power, which is input from the main transmission unit 323 to the sub-transmission unit 325, is input via the idle gears to the transmission shaft 404 provided with the 4WD clutch 324, whereby transmission of a driving force to the front wheels 301 is performed. Switching into an accelerated front-wheel drive from a common front-wheel drive is able to be performed by effects of the 4WD clutch 324. When the 4WD clutch 324 is put into neutral, drive of the front wheels 301 is severed and only the rear wheels are driven (namely, 2WD).

The power transmitted to subsequent-stage parts of the 4WD clutch 324 is transmitted to the front wheels 301 via the front-wheel differential gear device 320 and a front-wheel planetary-gear mechanism 390.

The tractor 1 as a work vehicle includes a Power Take Off (PTO) clutch 366. The tractor 1 connects the PTO clutch 366 to be able to transmit the power output from the engine. 321 into a PTO shaft 392.

A first PTO-transmission shifter 371 and a second PTO-transmission shifter 372 are arranged in a prior stage of the PTO shaft 392. When the first PTO-transmission shifter 371 and the second PTO-transmission shifter 372 are operated, the PTO shaft 392 is able to be rotated in the normal direction at a speed from a low speed to a high speed, moreover, is able to be rotated in the reverse direction.

Next, with reference to FIG. 4, a control system of the automatic stop system of the tractor 1 will be explained. As illustrated in FIG. 4, the tractor 1 according to the present embodiment is able to control the units by using an electronic control, and includes the vehicle controller 100 that is the core of the control system. The vehicle controller 100 receives an instruction signal sent from, for example, the remote controller 2 or the portable communication terminal 3 via the communication unit 110, and controls the automatic travelling unit 160 to be able to perform an automatic travel.

The vehicle controller 100 included in the tractor 1 includes a storage 140, and a plurality of controllers 120, 130, 150. The storage 140 is constituted of a hard disk, a Read Only Memory (ROM), a Random Access Memory (RAM), etc., in which various programs and needed data are stored. Each of the controllers 120, 130, 150 is constituted of a processing unit including a Central Processing Unit (CPU) etc., in addition to the ROM, the RAM, etc.

There exist, as the controllers 120, 130, 150, for example, the travelling system controller 120 for controlling a travel system, the engine controller 130 for controlling the engine 321, the working system controller 150 for controlling a work part such as a tiller to be connected with a rear part of the machine body, etc.

A processing unit that includes a CPU; a storage that includes a ROM for storing control programs, a RAM for a work region, etc.; and an input/output unit are provided to any of the travelling system controller 120, the engine controller 130, and the working system controller 150. The processing unit, the corresponding storage, and the corresponding input/output unit are connected with each other to be able to send and receive a signal to and from each other. The control programs etc. according to a controlling target of each of the controllers 120, 130, 150 are stored in the ROM of the corresponding storage.

To the vehicle controller 100, an emergency stop switch 210, a motor (not illustrated) for steering drive, and a travel driving apparatus 220 including the transmission mechanisms illustrated in FIGS. 2 and 3 are connected. Furthermore, to the vehicle controller 100, a group of obstacle detecting sensors such as (i) front and rear cameras (not illustrated) mounted on the tractor 1 and (ii) a corner detecting sonar; and various travel-system sensors 230 such as a steering-angle detecting sensor (not illustrated) for detecting a turning angle of the steering handle are connected. Furthermore, to the vehicle controller 100, a navigation system including the DGPS antenna 6 (see FIG. 1), a direction sensor, a vehicle-speed sensor, etc. are connected.

To the vehicle controller 100, a working-machine up-and-down driving apparatus 240 that includes a working-machine up-and-down device (not illustrated) etc. and a PTO ON/OFF operating switch 250 for performing an operation of turning ON and OFF on the PTO clutch 366 are connected. To the vehicle controller 100, various working machine system/PTO driving sensors 260 for controlling a work part or a device associated with the PTO, an engine driving apparatus 270, various sensors 280 for driving the engine, etc. are connected.

In this manner, a worker gets on the machine body to cause the tractor 1 to perform a predetermined work while travelling by the tractor 1, moreover, for example, operates the remote controller 2 so as to cause the vehicle controller 100 to control the driving of the automatic travelling unit 160, whereby the tractor 1 is able to perform a predetermined work while travelling automatically.

When causing the tractor 1 to travel automatically, a scheduled traveling route according to work contents is preliminary decided for each field, for example, and the corresponding route is digitized to be stored in the storage 140. This scheduled traveling route is set in accordance with a shape and the size of a field; the width, the length, and the number of ridges formed in the field; a type of a crop; etc.

The automatic travel of the tractor 1 may be appropriately set in other than the case where the vehicle controller 100 is caused to perform the automatic travel via the remote controller 2 as described in the present embodiment.

The portable communication terminal 3, which is connected to the vehicle controller 100 of the tractor 1 by using the plurality of communication systems R, includes a storage 31, a display 32, and an operation unit 33. The storage 31 is constituted of, for example, a ROM (Read Only Memory), a RAM (Random Access Memory), etc. and the display 32 and the operation unit 33 are constituted of, for example, a touch panel. The operation unit 33 may be provided with various keys and buttons etc.

The plurality of communication systems R, which is able to transmit and receive signals between the portable communication terminal 3 and the vehicle controller 100, includes the first communication system R1 for transmitting and receiving the first signal and the second communication system R2 for transmitting and receiving the second signal. The short-distance radio communication standard is used in the second communication system R2, which has a smaller communication area than at least that of the first communication system R1.

The vehicle controller 100 is configured to stop travelling of the travelling vehicle body 10 and further to stop driving of the PTO shaft 392 that extracts the power to the work part from the engine 321 when receiving the second signal during travelling of the travelling vehicle body 10.

Therefore, when the portable communication terminal 3 exists in the neighborhood of the tractor 1, the travel of the tractor 1 is able to be automatically stopped and the drive of the PTO shaft 392 is also able to be stopped. Thus, it is possible to improve the safety in the automatic travel of the tractor 1.

In a case where the travelling vehicle body 10 is travelling, when receiving the first signal sent from the portable communication terminal 3 that is carried by the worker M existing out of the automatic stop area S, the vehicle controller 100 also stops the travel of the travelling vehicle body 10. The vehicle controller 100 simultaneously stops the drive of the PTO shaft 392 that extracts the power to the work part from the engine 321.

Moreover, the worker M is able to operate, by using the portable communication terminal 3, with respect to the stop of the tractor 1 even from a position that is comparatively far away from the tractor 1. Moreover, in this case, the work part is also stopped, and thus it is possible to more improve the safety.

Next, a configuration of the remote controller 2 that is able to perform a remote operation on the tractor 1 will be explained. As illustrated in FIG. 4, the remote controller 2 is able to communicate with the third communication unit 113 of the tractor 1 in a wireless manner by using the third communication system R3. The remote controller 2 includes an operation unit. The operation unit includes an advance "ON/OFF" switch 21 and reverse "ON/OFF" switch 22 that are for causing the tractor 1 to travel, an ENG rotation-speed switch 24 for switching rotation speeds of the engine 321, and a vehicle stopping switch 26 by which the tractor 1 is able to be urgently stopped.

The remote controller 2 includes a PTO "ON/OFF" switch 23 and a working machine "UP/DOWN" switch 25 for operating a work part.

In this manner, the worker M operates the remote controller 2 to be able to cause the tractor 1 to advance or reverse at a predetermined speed and further to stop, moreover, to be able to raise a work part and cause the work part to work at a predetermined power.

Figure 5:
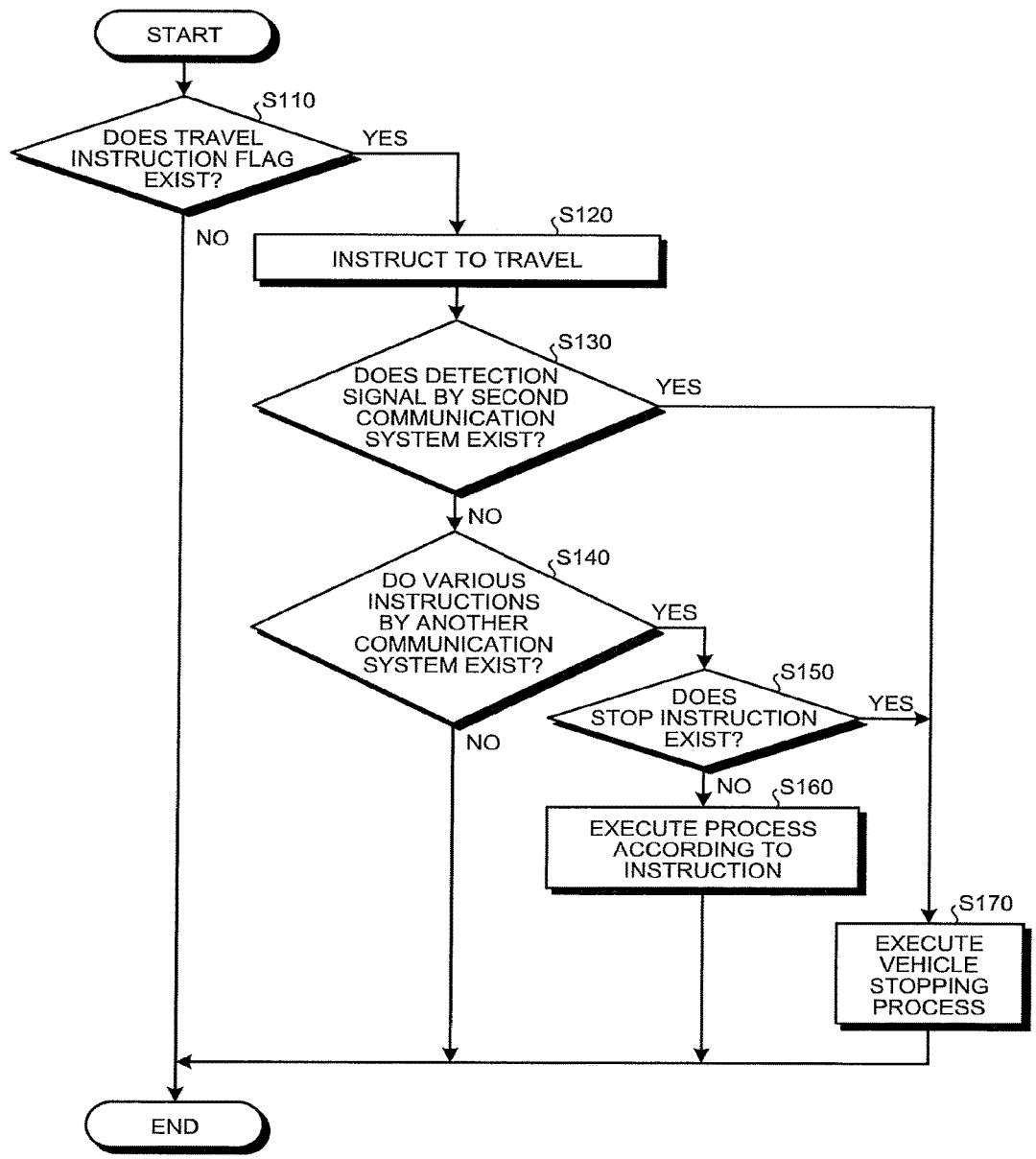
FIG. 5 is a flowchart illustrating one example of a processing procedure for automatic stopping processes of the work vehicle according to the embodiment.

A stopping process of the tractor 1 and the automatic stop system of the tractor 1 having the above configurations will be explained with reference to FIG. 5. FIG. 5 is a flowchart illustrating one example of a processing procedure for automatic stopping processes of the tractor 1. It is assumed that, when receiving the first signal sent from the portable communication terminal 3 via the first communication system R1 or a travel instruction signal sent from the remote controller 2 via the third communication system R3, the vehicle controller 100 according to the present embodiment sets a travel instruction flag.

As illustrated in FIG. 5, the vehicle controller 100 first determines whether or not there exists the above travel instruction flag (Step S110). When determining that there exists no travel instruction flag (Step S110: No), the vehicle controller 100 terminates the process. On the other hand, when determining that there exists the travel instruction flag (Step S110: Yes), the vehicle controller 100 outputs a travel instruction (Step S120). In other words, the vehicle controller 100 drives the automatic travelling unit 160 so as to cause the tractor 1 to start.

Next, the vehicle controller 100 determines whether or not there exists a detection signal by the second communication system R2 (Step S130). In other words, existence of a detection signal by the second communication system R2 indicates the fact that the possibility that the worker M carrying the portable communication terminal 3 exists in the automatic stop area S illustrated in FIG. 1 is high.

Therefore, when determining that there exists a detection signal by the second communication system R2 (Step S130: Yes), the vehicle controller 100 shifts the process to Step S170, executes a vehicle stopping process, and stops the travel of the tractor 1. Specifically, the vehicle controller 100 drives the brake solenoids 330 so as to drive the brake cylinders 311, and operates the brake devices 312 (see FIG. 2).

On the other hand, in Step S130, when determining that there exists no detection signal by the second communication system R2 (Step S130: No), the vehicle controller 100 determines whether or not there exist various instructions by another communication system (Step S140). For example, the vehicle controller 100 determines whether or not there exists a vehicle stopping signal sent from the portable communication terminal 3 via the first communication system R1, or there exists various instruction signals sent from the remote controller 2 via the third communication system R3.

When determining that there exist no various instruction signals sent from another communication system (Step S140: No), the vehicle controller 100 terminates the process. On the other hand, when determining that there exist various instruction signals sent from another communication system (Step S140: Yes), the vehicle controller 100 determines whether or not the signals includes a stop instructing signal (Step S150).

In Step S150, when the received signals do not include a stop instructing signal (Step S150: No), the vehicle controller 100 executes processes according to the received instruction signals (Step S160). In other words, when the instruction signals include an acceleration or deceleration instruction, the vehicle controller 100 changes an output of the engine 321, when the instruction signals include an instruction signal associated with an output of the work part, the vehicle controller 100 increases or decreases the rotation speed of the PTO shaft 392, for example, and terminates the process.

In Step S150, when the received signals include a stop instructing signal (Step S150: Yes), the vehicle controller 100 shifts the process to Step S170 so as to execute a vehicle stopping process, and stops the tractor 1 at once.

Although omitted in FIG. 5, in Step S170, a stopping process of the work part may be executed simultaneously with the vehicle stopping process. In other words, the drive of the PTO shaft 392 is stopped that extracts the power to the work part from the engine 321.

The drive stopping process of the PTO shaft 392 may be sequentially executed just after the vehicle stopping process, not simultaneously with a vehicle stop.

By executing the above processes, the safety of the tractor 1 according to the present embodiment is able to be highly improved even when the automatic drive is performed.

Among the above processes, the order of the process of Step S130 and that of Step S140 may be exchanged.

According to the above embodiment, the following tractor 1 (work vehicle) and the automatic stop system of the tractor 1 are realized.

(1) A work vehicle includes: (i) the travelling vehicle body 10 that includes the engine 321 as a power source to a work part and a travel part; (ii) the communication unit 110 that is able to transmit and receive signals to and from the portable communication terminal 3; (iii) the vehicle controller 100 that is able to control the travel part on the basis of a signal transmitted from the portable communication terminal 3 and received by the communication unit 110. The plurality of communication systems R is provided between the communication unit 110 and the portable communication terminal 3. The plurality of communication systems R includes: (i) the first communication system R1 that is able to transmit a first signal from the portable communication terminal 3; and (ii) the second communication system R2 that has a smaller communication area than that of the first communication system R1 and is able to receive a second signal. The second signal indicates that the portable communication terminal 3 exists in the predetermined area S.

By employing the work vehicle (tractor 1) in (1), it is possible to detect the fact that the portable communication terminal 3 exists in the near distance, in addition to the signal transmitted by the remote operation. It is accordingly possible to previously detect a risk in the neighborhood of the vehicle to be able to contribute to improvement in the safety.

(2) The work vehicle in (1), in which a short-distance radio communication standard is employed for the second communication system R2, and the vehicle controller 100 stops a travel of the travelling vehicle body 10 when receiving the second signal during the travel of the travelling vehicle body 10.

By employing the work vehicle (tractor 1) in (2), it is possible to cause the tractor 1 to automatically stop when the portable communication terminal 3 exists in the near distance. It is accordingly possible to more improve the safety, in addition to an effect of the work vehicle in (1).

(3) The work vehicle in (2), in which the vehicle controller 100 stops a drive of the PTO shaft 392 that extracts a power to the work part from the engine 321, when receiving the second signal.

By employing the work vehicle (tractor 1) in (3), it is possible to stop driving the PTO shaft when the vehicle is automatically stopped, for example, to be able to stop operation of the work part. It is accordingly possible to more improve the safety, in addition to an effect of the work vehicle in (2).

(4) The work vehicle in (2) or (3), in which a communication standard, which has a larger communication area than that of the short-distance radio communication standard, is employed for the first communication system R1, and the vehicle controller 100 stops the travel of the travelling vehicle body 10 when receiving the first signal during the travel of the travelling vehicle body 10.

By employing the work vehicle in (tractor 1) (4), it is possible to cause the work vehicle to stop by using the remote operation even when the worker M1 does not approach the work vehicle (tractor 1), for example, in addition to an effect of the work vehicle in (2) and (3).

(5) The work vehicle in (4), in which the vehicle controller 100 stops a drive of the PTO shaft 392 that extracts a power to the work part from the engine 321, when receiving the first signal.

By employing the work vehicle (tractor 1) in (5), it is possible to stop the operation of the work part when the vehicle is stopped by the remote operation. It is accordingly possible to more improve the safety, in addition to an effect of the work vehicle in (4).

(6) A work vehicle includes: (i) the travelling vehicle body 10 that includes the engine 321 as a power source to a work part and a travel part; (ii) the communication unit 110 that is able to transmit and receive signals to and from the portable communication terminal 3 so as to receive a first signal based on a remote operation of the portable communication terminal 3, and to receive a second signal indicating that the portable communication terminal 3 exists in a predetermined area; and (iii) the vehicle controller 100 that is able to control the travel part on the basis of one of the first and second signals transmitted from the portable communication terminal 3 and received by the communication unit 110.

By employing the work vehicle (tractor 1) in (6), it is possible to secure the safety even when the worker M1 carrying the portable communication terminal 3 is in the neighborhood of the tractor 1, and to control the tractor 1 by using the remote control when the worker M1 is far from the tractor 1.

(7) An automatic stop system of a work vehicle includes: (i) a work vehicle that includes a travel part, such as the tractor 1; (ii) the portable communication terminal 3; (iii) the communication unit 110 that is able to transmit and receive signals to and from the portable communication terminal 3 via the plurality of communication systems R; and (iv) the travelling system controller 120 as a travel stopping unit that stops a travel of the work vehicle on the basis of a signal transmitted from the portable communication terminal 3 and received by the communication unit 110. The plurality of communication systems R includes: (i) the first communication system R1 that is able to transmit a first signal, which is for stopping a travel of the work vehicle, from the portable communication terminal 3 to the work vehicle; and (ii) the second communication system R2 that has a smaller communication area than that of the first communication system R1 and is able to receive a second signal indicating that the portable communication terminal 3 exists in the predetermined area S.

By employing the work vehicle (tractor 1) in (7), it is possible to detect the fact that the portable communication terminal exists in the near distance, in addition to the signal transmitted by the remote operation. It is accordingly possible to previously detect a risk in the periphery and neighborhood of the vehicle to be able to contribute to improvement in the safety.

(8) An automatic stop system of a work vehicle includes: (i) the travelling vehicle body 10 that includes the engine 321 as a power source to a work part and a travel part; (ii) the portable communication terminal 3; (iii) the communication unit 110 that is able to transmit and receive signals to and from the portable communication terminal 3; and (iv) the vehicle controller 100 that includes the travelling system controller 120. The travelling system controller 120 is able to control the travel part on the basis of a signal transmitted from the portable communication terminal 3 and received by the communication unit 110, performs a control for stopping the travelling vehicle body 10 on the basis of a first signal based on a remote operation of the portable communication terminal 3, and performs a control for stopping the travelling vehicle body 10 on the basis of a reception of a second signal indicating that the portable communication terminal 3 exists in a predetermined area.

By employing the automatic stop system of the work vehicle (tractor 1) in (7), it is possible to secure the safety even when the worker M1 carrying the portable communication terminal 3 is in the neighborhood of the tractor 1, and to control the tractor 1 by using the remote control when the worker M1 is far from the tractor 1.

The above embodiment is only an example and does not intend to limit the scope of the present disclosure. The embodiment can be performed in other various forms, and various omissions, replacements, combinations, and modifications can be made without departing from the essence of the present disclosure. For example, the work vehicle is not limited to the tractor 1, and all of objects that perform a work while travelling in a field are included in the work vehicle. The respective configurations and specifications such as shape and display element (structure, type, direction, shape, size, length, width, thickness, height, number, arrangement, position, material, or the like) can appropriately be modified to be performed.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A work vehicle comprising:
a travelling vehicle body that includes a power source to a work part and a travel part; and
a processor that is mounted on the travelling vehicle body, wherein
the processor is programmed to:
directly receive signals from a portable communication terminal carried by a worker via a plurality of communication channels, the plurality of communication channels including (i) a first communication channel and (ii) a second communication channel having a communicable area that is smaller than a communicable area of the first communication channel; and
control the travel part based on a received signal transmitted from the portable communication terminal, wherein
the first communication channel is a communication channel via which the processor receives a signal for operating the travel part, the signal for operating the travel part being transmitted, in response to an input of the worker, from the portable communication terminal, and
the second communication channel is a communication channel via which the processor receives a detection signal automatically transmitted from the portable communication terminal, the detection signal indicating that the portable communication terminal exists within the communicable area of the second communication channel.

2. The work vehicle according to claim 1, wherein
a short-distance radio communication standard is employed for the second communication channel, and
the processor is further programmed to stop a travel of the travelling vehicle body when receiving the detection signal during the travel of the travelling vehicle body.

3. The work vehicle according to claim 2, wherein
the processor is further programmed to stop a drive of a Power-Take-Odd (PTO) shaft that extracts a power to the work part from the power source, when receiving the detection signal.

4. The work vehicle according to claim 2, wherein
a communication standard, which has a larger communication area than that of the short-distance radio communication standard, is employed for the first communication channel, and
the processor is further programmed to stop the travel of the travelling vehicle body when receiving the signal for operating the travel part during the travel of the travelling vehicle body.

5. An automatic stop system of a work vehicle, the system comprising:
a travelling vehicle body that includes a power source to a work part and a travel part;
a portable communication terminal;
a processor that is mounted on the travelling vehicle body, wherein
the processor is programmed to
directly receive signals the portable communication terminal carried by a worker via a plurality of communication channels, the plurality of communication channels including (i) a first communication channel and (ii a second communication channel having a communicable area that is smaller than a communicable area of the first communication channel; and
control the travel part based on a received signal transmitted from the portable communication terminal, wherein
the first communication channel is a communication channel via which the processor receives a signal for stopping the travel part, the signal for stopping the travel part being transmitted, in response to an input of the worker, from the portable communication terminal, and the second communication channel is a communication channel via which processor receives a detection signal automatically transmitted from the portable communication terminal, the detection signal indicating that the portable communication terminal exists within the communicable area of the second communication channel, and the processor is further programmed to when receiving any one of (i) the signal for stopping the travel part and (ii) the detection signal, cause the travelling vehicle body to stop.

6. The work vehicle according to claim 1, wherein the processor is further programmed to:

receive, via the first communication channel, a signal for stopping the travel part, the signal for stopping the travel part being transmitted, in response to an input of the worker, from the portable communication terminal; and when receiving any one of (i) the signal for stopping the ravel part and (ii) the detection signal, cause the travelling vehicle body to stop.

7. The work vehicle according to claim 1, wherein the processor is further programmed to:

communicate, via a third communication channel, with a remote controller that causes the travelling vehicle body to advance, reverse, or stop; and when determining that there presents no detection signal transmitted via the second communication channel, execute a process that is based on an operation transmitted from the remote controller via the third communication channel.

8. The work vehicle according to claim 1, wherein the processor is further programmed to:

execute a process for stopping a Power-Take-Off (PTO) shaft after having caused the travelling vehicle body to stop.

\* \* \* \* \*